(12) United States Patent
Woo et al.

(10) Patent No.: US 9,108,749 B2
(45) Date of Patent: Aug. 18, 2015

(54) SPACECRAFT MOMENTUM MANAGEMENT

(75) Inventors: Byoungsam Woo, San Jose, CA (US); Mohammad Saghir Munir, Union City, CA (US); Kam K. Chan, Saratoga, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 832 days.

(21) Appl. No.: 13/326,654

(22) Filed: Dec. 15, 2011

(65) Prior Publication Data

US 2012/0097797 A1    Apr. 26, 2012

Related U.S. Application Data

(63) Continuation-in-part of application No. 12/925,386, filed on Oct. 20, 2010.

(51) Int. Cl.
*B64G 1/26* (2006.01)
*B64G 1/24* (2006.01)
*F03H 1/00* (2006.01)

(52) U.S. Cl.
CPC *B64G 1/26* (2013.01); *B64G 1/242* (2013.01); *F03H 1/0037* (2013.01)

(58) Field of Classification Search
CPC ....................................................... B64G 1/26
USPC .............. 244/158.4, 158.6, 158.8, 156.5, 164
See application file for complete search history.

(56) References Cited

U.S. PATENT DOCUMENTS

| | | | |
|---|---|---|---|
| 4,010,921 A | | 3/1977 | Pistiner et al. |
| 5,349,532 A | * | 9/1994 | Tilley et al. ..................... 701/13 |
| 5,595,360 A | * | 1/1997 | Spitzer ........................ 244/158.5 |
| 5,984,236 A | * | 11/1999 | Keitel et al. ................... 244/164 |
| 6,116,543 A | | 9/2000 | Koppel |

(Continued)

OTHER PUBLICATIONS

Chen, X. and Steyn, W., Optimal combined reaction-wheel momentum management for LEO Earth-pointing satellites, 12th AIAA/USU Conference on Small Satellites, SSC98-IX-2, 1998.

(Continued)

*Primary Examiner* — Isam Alsomiri
*Assistant Examiner* — Justin Benedik
(74) *Attorney, Agent, or Firm* — Weaver Austin Villeneuve & Sampson LLP

(57) ABSTRACT

Three-axis spacecraft momentum management is performed for a spacecraft traveling along a trajectory, by an actuator including at least one thruster disposed on a single positioning mechanism. As the spacecraft travels along the trajectory, a desired line of thrust undergoes a substantial rotation in inertial space. When the spacecraft is located at a first location on the trajectory, the single positioning mechanism orients the thruster so as to produce a first torque to manage stored momentum in at least one of a first and a second of the three inertial spacecraft axes. When the spacecraft is located at a second location on the trajectory, the single positioning mechanism orients the thruster so as to produce a second torque to manage stored momentum in at least a third of the three inertial spacecraft axes.

17 Claims, 11 Drawing Sheets

(56) References Cited

U.S. PATENT DOCUMENTS

| | | | |
|---|---|---|---|
| 6,253,125 B1 * | 6/2001 | Barker | 701/13 |
| 6,293,501 B1 * | 9/2001 | Kurland | 244/164 |
| 6,305,646 B1 * | 10/2001 | McAllister et al. | 244/158.8 |
| 6,543,723 B1 * | 4/2003 | Oh | 244/158.5 |
| 6,637,701 B1 * | 10/2003 | Glogowski et al. | 244/169 |
| 6,695,263 B1 * | 2/2004 | Goodzeit | 244/164 |
| 7,113,851 B1 | 9/2006 | Gelon et al. | |
| 2010/0179711 A1 * | 7/2010 | Munir et al. | 701/13 |
| 2012/0097796 A1 * | 4/2012 | Munir et al. | 244/158.6 |
| 2012/0097797 A1 * | 4/2012 | Woo et al. | 244/158.6 |

OTHER PUBLICATIONS

Brophy, John R. and Noca, Muriel, "Electric Propulsion for Solar System Exploration", Journal of Propulsion and Power vol. 14, No. 5, Sep.-Oct. 1998.

Kimbrel, Michael Scott, Jun. 2002, "Optimization of Electric Propulsion Orbit Raising", Massachusetts Institute of Technology, 102 pages.

* cited by examiner

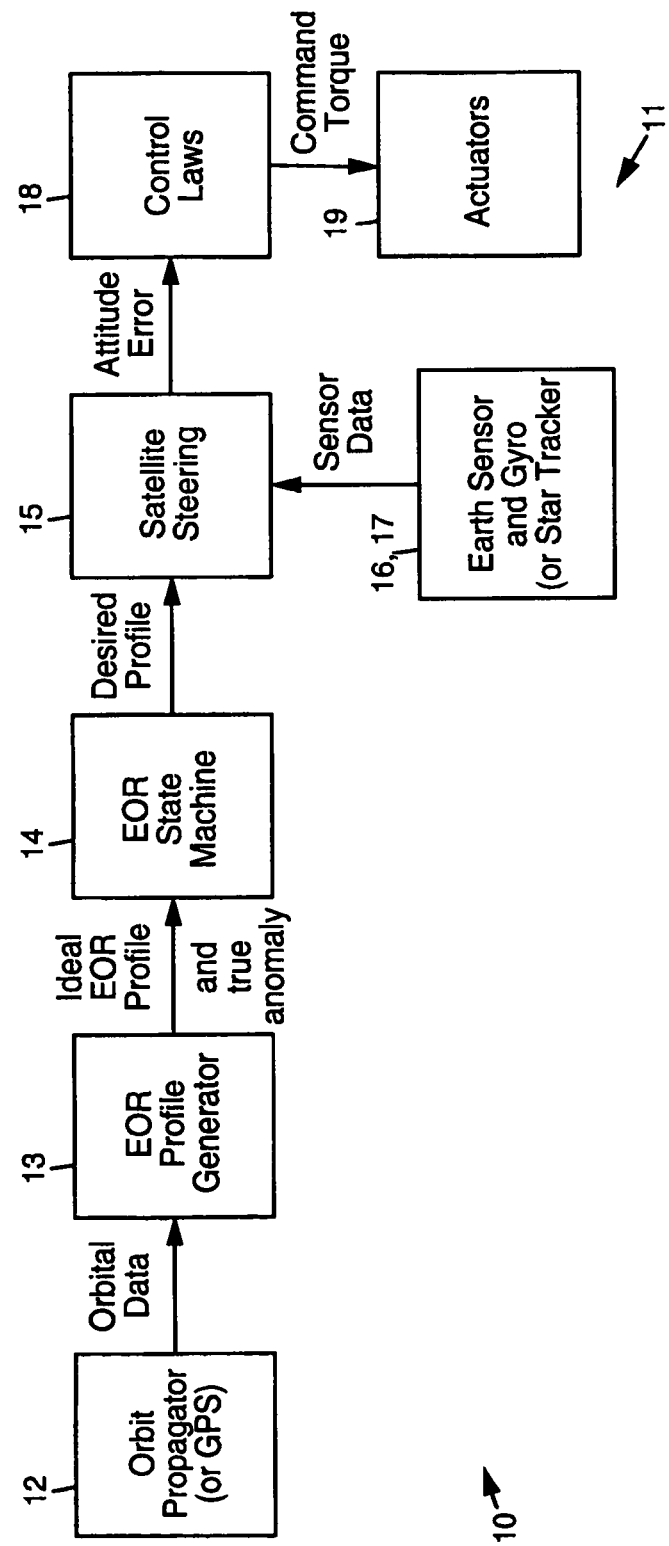

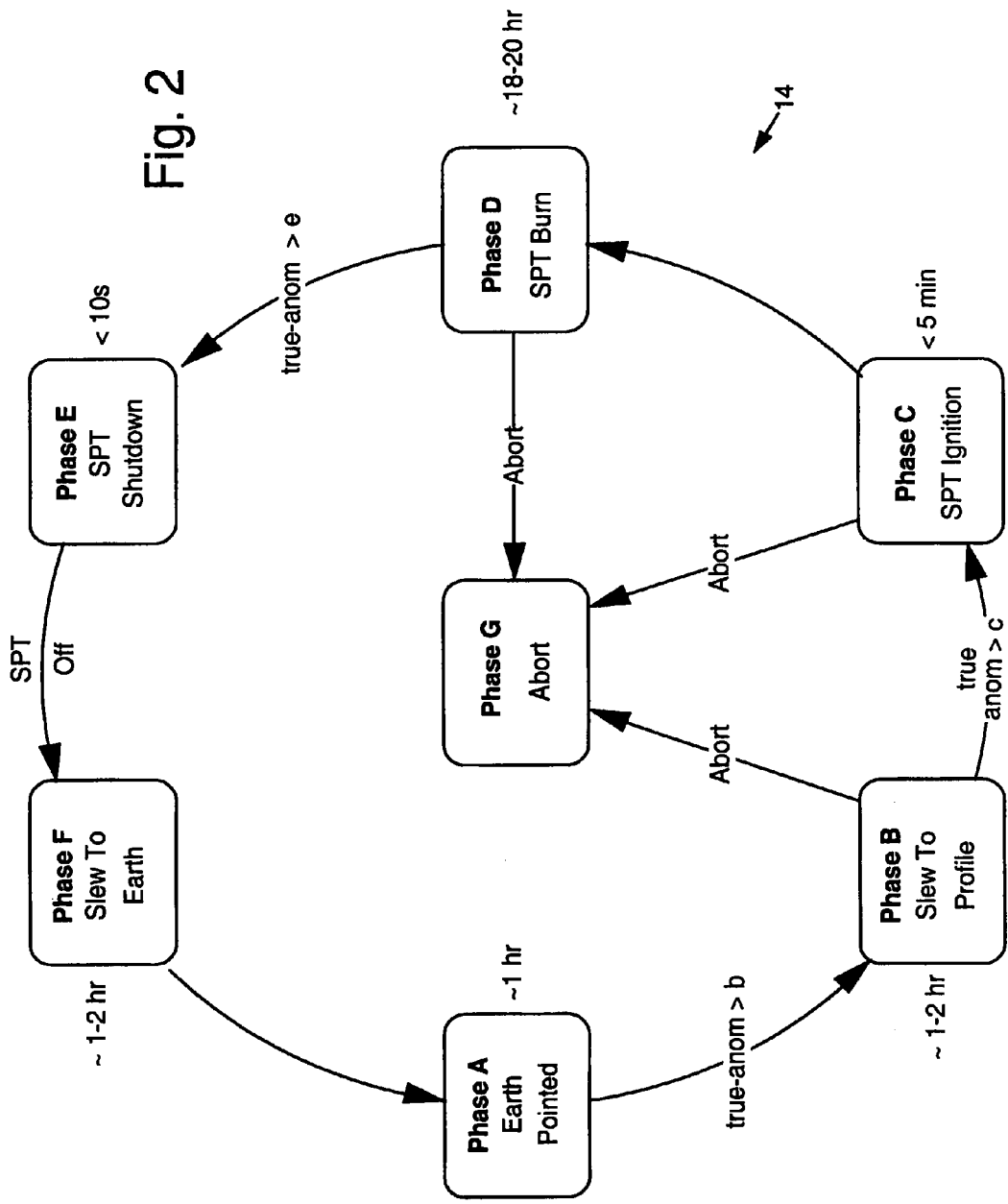

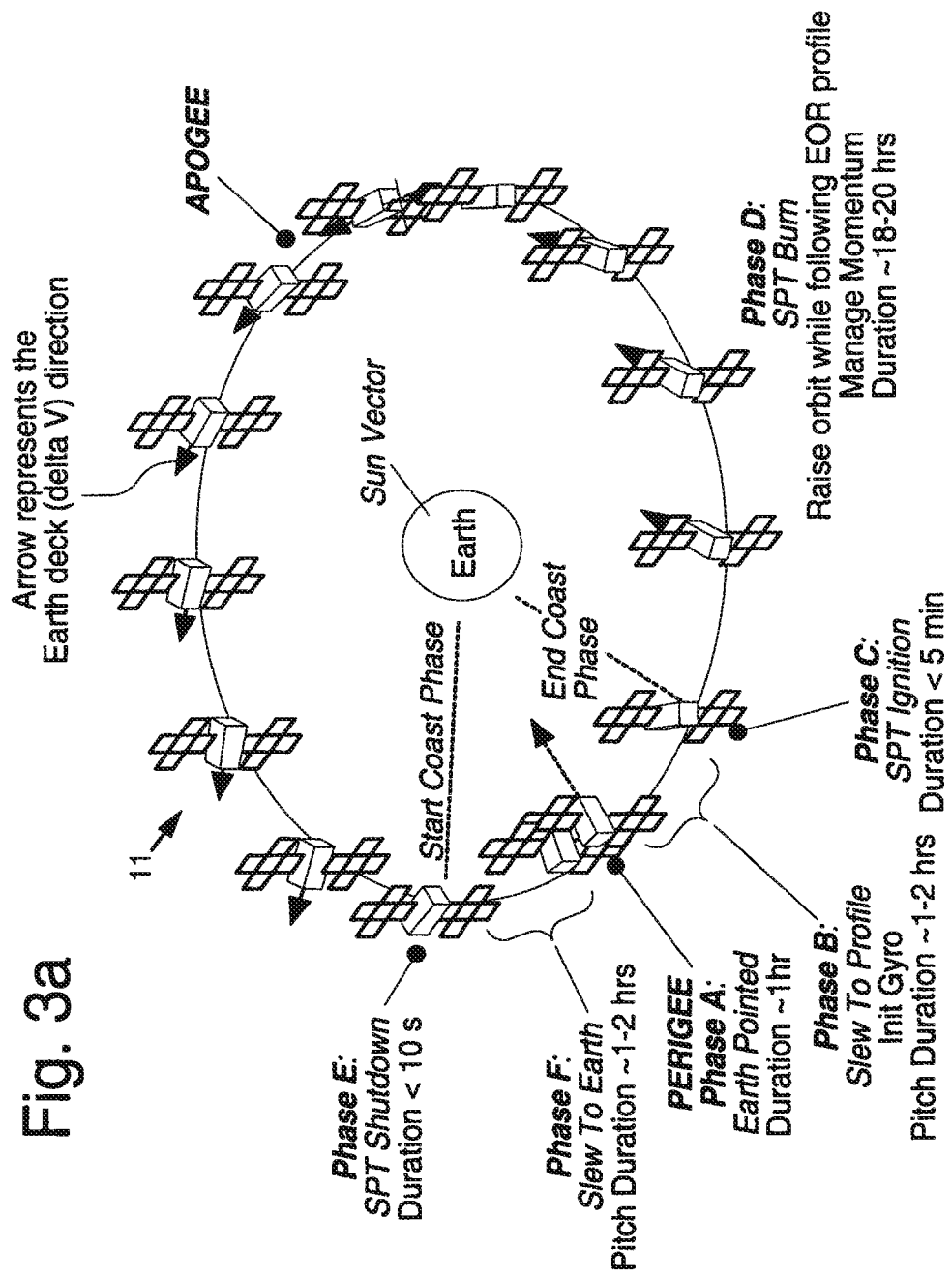

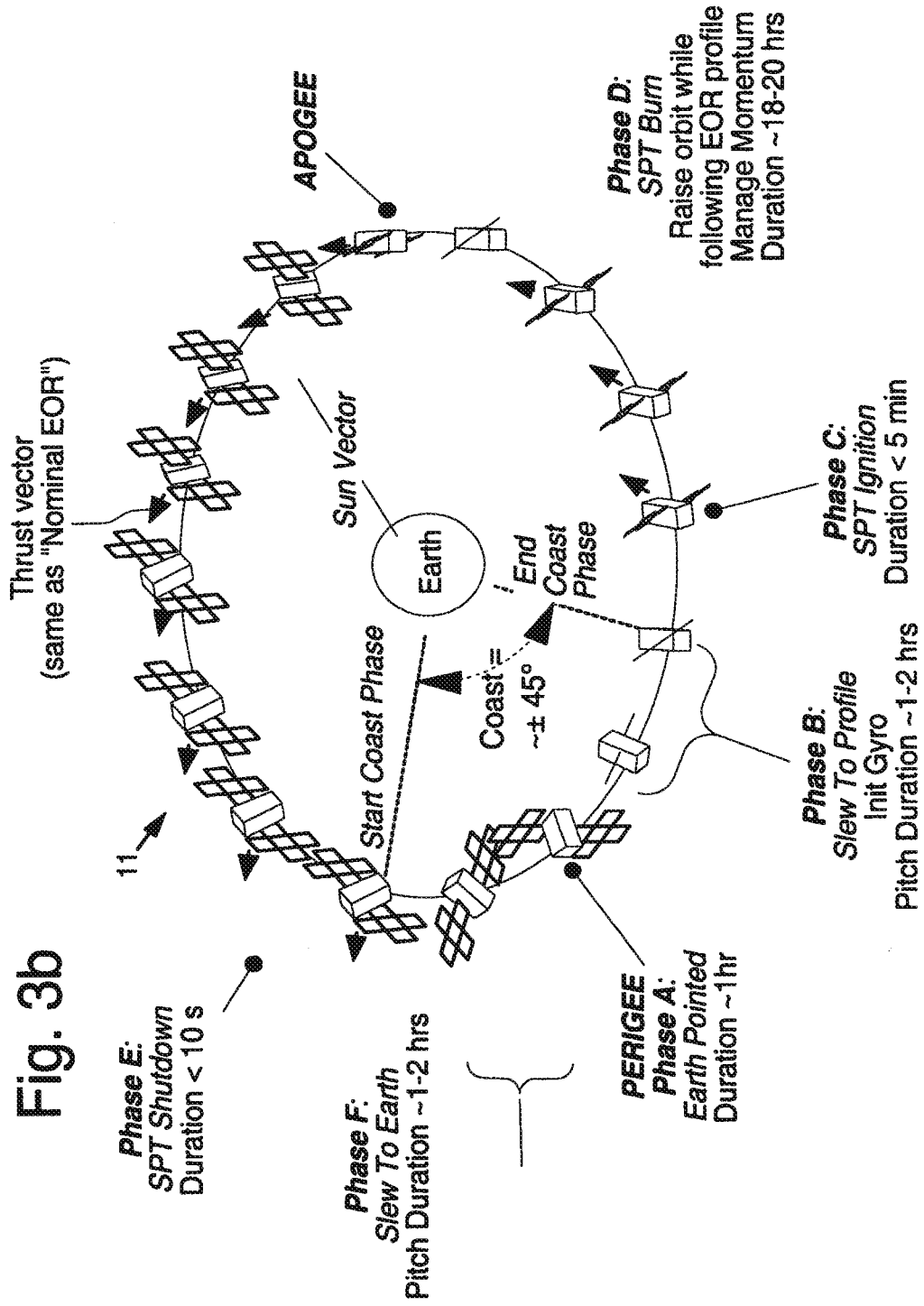

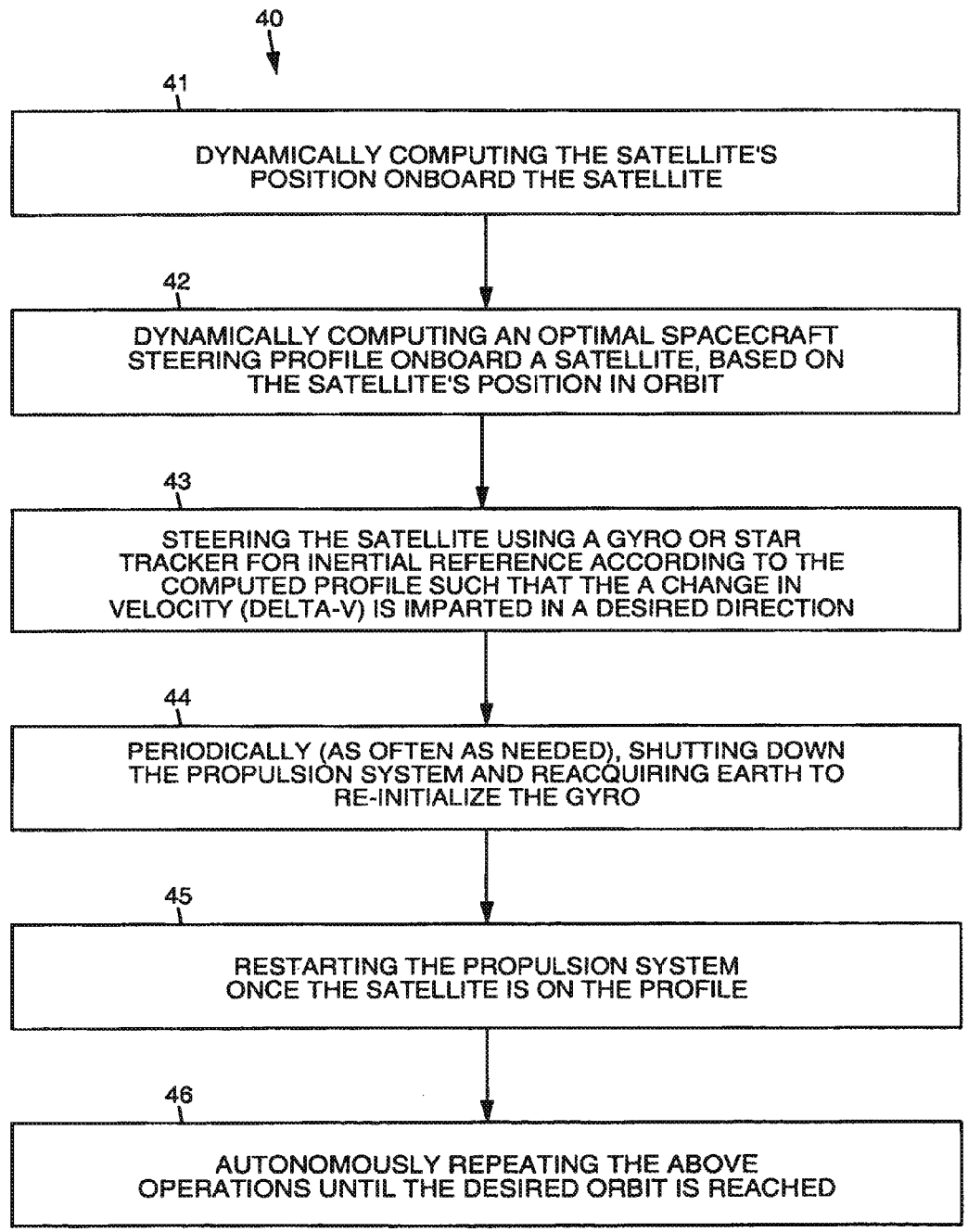

Nominal EOR requires both SPTs to be fired simultaneously

SPT fired such that the thrust vector is aimed toward anti-Earth deck

Modulating both DAPMs* will provide three axes momentum dumping (no bi-prop required)

SPACECRAFT MOMENTUM MANAGEMENT

RELATED APPLICATION

This application is a continuation-in-part of U.S. application Ser. No. 12/925,386, filed Oct. 20, 2010, the disclosure of which is hereby incorporated by reference in its entirety for all purposes.

TECHNICAL FIELD

This invention relates generally to spacecraft momentum management and, in particular, to providing three axes momentum management during orbit transfer maneuvers such as orbit raising.

BACKGROUND

The assignee of the present invention manufactures and deploys spacecraft for, commercial, defense and scientific missions. On board propulsion systems of such spacecraft are frequently required to perform orbit raising (or transfer). For example, there is frequently a requirement for commercial spacecraft to perform orbit raising from a launch vehicle transfer orbit to a geosynchronous orbit. As a further example, certain missions may require transfers between orbits. Such maneuvers may be performed with chemical thrusters, or with one or more with low thrust electric thrusters, as described by Oh, U.S. Pat. No. 6,543,723 (hereinafter "Oh"), assigned to the assignee of the present invention, and Gelon, et al., U.S. Pat. No. 7,113,851, (hereinafter "Gelon") entitled "Practical Orbit Raising System and Method for Geosynchronous Satellites" assigned to the assignee of the present invention, and Gelon.

Known orbit raising techniques are also described in U.S. Pat. No. 5,595,360 issued to Spitzer, entitled "Optimal Transfer Orbit Trajectory Using Electric Propulsion," U.S. Pat. No. 6,116,543, issued to Koppel, entitled "Method and a System for Putting a Space Vehicle into Orbit, Using Thrusters of High Specific Impulse."

Characteristically, during such transfers, spacecraft momentum has to be managed so as to provide three axis attitude control. Momentum storage systems are employed to store accumulated momentum resulting from a disturbance torque environment, and thereby reduce the pointing disturbance and propellant usage associated with a thruster actuation. These systems, consisting of reaction wheels, have a storage capacity that may be described in terms of a permissible range of wheel speeds. As a result, a momentum management strategy must use thrusters or other actuators such as magnetic torquers or solar sailing techniques to unload momentum in order to prevent wheel speeds from going outside the permissible range.

Known orbit raising techniques provide momentum management during long duration operation of electric propulsion thrusters by gimbaling and/or throttling the thruster(s) providing the orbit raising velocity change. Where, as is desirable for reliability and cost reasons, orbit raising is to be performed with thruster(s) mounted on a single positioning mechanism, a problem arises that such a single gimbaled thruster can only provide torque about the two axes orthogonal to its thrust axis. Thus, it is not possible to generate torque parallel to the thrust vector. Conventionally, this problem is solved by providing at least one additional actuator to provide yaw authority. As a result, system performance is penalized by the additional hardware cost, mass, and complexity.

SUMMARY

The present inventors have recognized that, for a spacecraft traveling along a trajectory, three-axis spacecraft momentum management may be advantageously performed by an actuator consisting of as few as one thruster disposed on a single positioning mechanism. As the spacecraft travels along the trajectory, a desired line of thrust undergoes a substantial rotation in inertial space, and the single positioning mechanism is configured to orient the thruster so as to simultaneously (i) accelerate the spacecraft along a line of thrust and (ii) produce a torque around at least one of two axes substantially orthogonal to the nominal thrust vector. When the spacecraft is located at a first location on the trajectory, the single positioning mechanism orients the thruster so as to produce a first torque to manage stored momentum in at least one of a first and a second of the three inertial spacecraft axes. When the spacecraft is located at a second location on the trajectory, the single positioning mechanism orients the thruster so as to produce a second torque to manage stored momentum in at least a third of the three inertial spacecraft axes.

In an embodiment, momentum of a spacecraft traveling along a trajectory is managed by determining a respective momentum storage error (MSE) in each of three inertial spacecraft axes. The respective MSE is a difference, for each axis, between a momentum value actually stored on the spacecraft and a desired momentum value. Each respective MSE is reduced by producing, with at least one thruster disposed on a single positioning mechanism, a plurality of torques, by orienting the thruster, with the single positioning mechanism, so as to produce a first torque that reduces the respective MSE of a first and/or a second of the three inertial spacecraft axes when the spacecraft is located at a first location on the trajectory. The thruster is oriented with the single positioning mechanism, so as to produce a second torque that reduces the respective MSE of at least a third of the three inertial spacecraft axes when the spacecraft is located at a second location on the trajectory. The single positioning mechanism is configured to orient the thruster so as to simultaneously (i) accelerate the spacecraft along a line of thrust and (ii) produce a torque around at least one of two axes substantially orthogonal to the nominal thrust vector. As the spacecraft travels along the trajectory, a desired line of thrust undergoes a substantial rotation in inertial space.

In another embodiment, spacecraft acceleration and MSE may be simultaneously controlled by the at least one thruster disposed on the single positioning mechanism.

In an embodiment, the thruster may be a low thrust electric propulsion device. The thruster may be a Hall effect thruster.

In a further embodiment, as the spacecraft may travel along the trajectory, the substantial rotation may be approximately ninety degrees.

In another embodiment, the single positioning mechanism may have two degrees of freedom.

In an embodiment, a spacecraft has at least one thruster and spacecraft control electronics configured to: (i) generate a desired orbit transfer profile for the spacecraft; and (ii) determine a respective momentum storage error (MSE) in each of three inertial spacecraft axes. The respective MSE is a difference, for each axis, between a momentum value actually stored on the spacecraft and a desired momentum value. The spacecraft also has a spacecraft steering apparatus, including the at least one thruster disposed on a single positioning mechanism, that, responsive to signals from the spacecraft control electronics: controls the attitude of the spacecraft so as to follow the desired orbit transfer profile; and reduces each respective MSE by producing, with the at least one thruster, a plurality of torques, by (i) orienting the thruster, with the single positioning mechanism, so as to produce a first torque that reduces the respective MSE of a first and/or a second of the three inertial spacecraft axes when the spacecraft is located at a first location on the trajectory, and, (ii) orienting the thruster, with the single positioning mechanism, so as to produce a second torque that reduces the respective MSE of at least a third of the three inertial spacecraft axes when the spacecraft is located at a second location on the trajectory. The single positioning mechanism is configured to orient the thruster so as to simultaneously (i) accelerate the spacecraft along a line of thrust and (ii) produce a torque around at least one of two axes substantially orthogonal to the nominal thrust vector. As the spacecraft travels along the trajectory, a desired line of thrust undergoes a substantial rotation in inertial space.

In another embodiment, the spacecraft control electronics may include profile generator configured to compute a desired orbit transfer profile such that perigee, apogee and inclination of the spacecraft are adjusted simultaneously in a mass-efficient manner.

In an embodiment the desired orbit transfer profile may include placing the spacecraft in an Earth-pointed attitude when the spacecraft is at a predefined point in the trajectory; slewing the spacecraft from the Earth-pointed attitude to a desired orbit raising attitude; and steering the spacecraft according to the desired orbit transfer profile while changing a spacecraft velocity.

In an embodiment, an optimal steering profile for a spacecraft is dynamically computed, based on position of the spacecraft on a trajectory, the spacecraft including at least one thruster disposed on a single positioning mechanism and an inertial is dynamically computed. The spacecraft is steered according to the computed optimal steering profile such that the at least one thruster imparts a change in velocity of the spacecraft along a desired direction. The at least one thruster is periodically shut down and the spacecraft is reoriented. The at least one thruster is restarted. The above steps are repeated until the desired orbit is reached. Three axis momentum management of the spacecraft is performed by determining a respective momentum storage error (MSE) in each of three inertial spacecraft axes, said respective MSE including a difference, for each axis, between a momentum value actually stored on the spacecraft and a desired momentum value; reducing each respective MSE by producing, with at least one thruster disposed on a single positioning mechanism, a plurality of torques, by: orienting the thruster, with the single positioning mechanism, so as to produce a first torque that reduces the respective MSE of either or both of a first and a second of the three inertial spacecraft axes when the spacecraft is located at a first location on the trajectory, and, orienting the thruster, with the single positioning mechanism, so as to produce a second torque that reduces the respective MSE of at least a third of the three inertial spacecraft axes when the spacecraft is located at a second location on the trajectory. The single positioning mechanism is configured to orient the thruster so as to simultaneously (i) accelerate the spacecraft along a line of thrust and (ii) produce a torque around at least one of two axes substantially orthogonal to the nominal thrust vector; and as the spacecraft travels along the trajectory, a desired line of thrust undergoes a substantial rotation in inertial space.

In an embodiment, the inertial references sensor includes a gyro that is reset to remove any drift when the spacecraft is in an Earth pointed orientation, using a calculated position of the Earth relative to the spacecraft, spacecraft orbital information and Earth sensor data.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIG. 1 illustrates an example of an architecture of apparatus that provides for electric propulsion satellite orbit raising;

FIG. 2 illustrates details of an example electric propulsion satellite orbit raising state machine;

FIG. 3a illustrates an example electric propulsion satellite orbit raising timeline for two SPT electric orbit raising FIG. 3b illustrates an example electric propulsion satellite orbit raising timeline for a single SPT electric orbit raising FIG. 4 illustrates an example electric propulsion satellite orbit raising method.

Figure 5A:
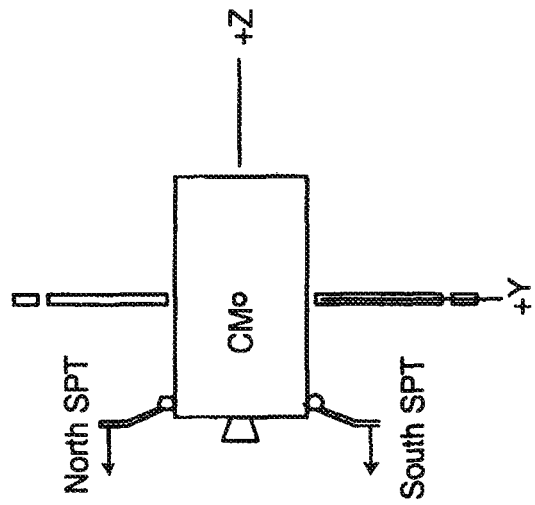
FIG. 5a illustrates an example orientation of the dual axes positioning mechanisms (DAPMs) for two SPT electric orbit raising.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

Referring to the drawing figures, disclosed are apparatus 10 (FIG. 1) and methods 40 (FIG. 4) for raising the orbit of a satellite using electric propulsion. In some embodiments, a state machine, an Earth sensor, and a gyro are employed. For example, FIG. 1 illustrates architecture of apparatus 10 that determines an attitude profile that the satellite should preferably follow during electric propulsion orbit raising. FIG. 2 illustrates details of an exemplary electric propulsion satellite orbit raising state machine 14 that may be employed in the apparatus 10 shown in FIG. 1. FIG. 3 illustrates an exemplary timeline that implements electric propulsion satellite orbit raising.

Referring to FIG. 1, satellite 11 may be configured to have an onboard positioning system 12, such as an orbit propagator or global positioning system (GPS). Onboard positioning system 12 may be coupled to an electric orbit raising (EOR) profile generator 13. EOR profile generator 13 may be coupled to EOR state machine 14. Outputs of the EOR state machine 14, along with data outputs from Earth sensor 16 and gyro 17 may be coupled to satellite steering apparatus 15. The satellite steering apparatus 15 outputs error signals that are input to control laws 18 that control the attitude of the satellite 11 via actuators 19, such as a wheel system, for example. Satellite 11 may be configured to have one or more electric propulsion thrusters (not illustrated), such as Hall effect thrusters (also referred to herein as stationary plasma thrusters, or SPT's), and/or bi-propellant thrusters (if desired).

In operation, and also referring to FIGS. 2 and 3, onboard positioning system 12 is used to compute the position of the satellite 11 in a dynamically changing orbit, accounting for firings of the electric propulsion thrusters and (if any) bi-propellant thrusters. The onboard positioning system 12 may generate instantaneous orbital data that are fed into the EOR profile generator 13. EOR profile generator 13 computes an ideal EOR attitude (profile) that the satellite 11 must follow so that the perigee, apogee and inclination of the satellite 11 can be adjusted simultaneously in a mass-efficient manner. This ideal profile is fed into the EOR state machine 14 which generates (computes) a desired profile to steer the satellite 11 according to the ideal profile during orbit raising (i.e., when in phase D). Otherwise the profile generated by the EOR state machine 14 keeps the satellite 11 Earth-pointed (i.e., when in phase A). In between, the profile generated by the state machine 14 either slews the satellite 11 from Earth-pointed configuration to the EOR desired attitude (i.e., phase B), or from an EOR-desired attitude to an Earth-pointed configuration (i.e., phase F). During phases C and E, the electric propulsion thrusters are started and shut down by state machine 14. Configuration of the on-board fault detection, isolation and recovery may also be carried out by the state machine 14 at the appropriate true-anomalies provided by the onboard positioning system 12 (orbit propagator 12 or global positing system 12). The true anomaly is the angle measured in the direction of motion from perigee to the position of the satellite 11 at some defined epoch time. The EOR state machine 14 also includes phase G which aborts any of phases B, C or D, which may be required to shut down the electric propulsion thrusters and return the satellite 11 to an Earth pointed orientation in the event of an anomaly. The Earth pointed orientation is generally trusted to be a safe attitude, as it guarantees telemetry and commanding when there is line of site coverage to a ground station.

The EOR profile generator 13 and the state machine 14 are parameterized by the instantaneous orbital elements (i.e., the orbital data from the positioning system 12). Therefore, given the on-board knowledge of the orbit, the desired time varying optimal steering attitude profile required for EOR, and the time at which state machine 14 transitions between major phases adjusts automatically. By the very nature of automatic Earth reacquisitions, to upright the satellite 11 and reset the gyro 16 based on the calculated position of the Earth relative to the satellite 11, satellite orbital knowledge and Earth sensor data (which indirectly localizes the satellite 11 with the correct Earth geometry), the effects of gyro drift are removed at the beginning of every revolution. All a user has to do is monitor each revolution of the satellite 11.

If the satellite 11 includes a star tracker, Earth acquisition would not be required, but the state machine 14 can still drive the entire EOR process and continue to provide the operational ease and autonomy for which it was designed. If there is an onboard GPS 12, then the orbit propagator 12 is also not required, as the GPS 12 can provide the desired information.

The apparatus 10 and methods 40 simultaneously drive the satellite perigee, apogee and inclination toward target values, with the entire process automated by the state machine 14 driven by the onboard positioning system 12 (orbit propagator 12 or GPS 12). The EOR process is simplified from an operations point of view, as a result of using the state machine 14. The state machine 14, like the optimal steering profiles, is parameterized by the onboard orbital data derived from the positioning system 12. The positioning system 12 (orbit propagator 12 or GPS) accounts for the changing orbit due to the firing of the SPTs with the satellite 11 in the optimal steering attitude. Thus, the optimal steering profile and state machine 14 are autonomously adjusted in terms of timing due to a dynamically changing orbit. All a ground station operator has to do is monitor the satellite 11.

The following presents details of the EOR process implemented by the apparatus 10 and methods 40. FIG. 2 illustrates details of an exemplary state machine 14. FIG. 3a illustrates an exemplary timeline for achieving electric propulsion satellite orbit raising.

The EOR process begins with the satellite 11 in an Earth pointed configuration, using the Earth sensor 16 (Phase A). At this time, the satellite 11 is steered in yaw, such that the roll rate reported by the gyro 16 is zero. Assuming that the gyro 16 is well-calibrated, the x-axis of the satellite 11 is in the orbital plane, with the z-axis of the satellite 11 locked onto the Earth. This phase of the EOR state machine 14 is shown in FIGS. 2 and 3, and is identified as phase A, and is referred to as the Earth pointed phase.

Once the desired true anomaly is reached, the state machine 14 transitions to phase B where the gyro 15 is initialized with respect to an inertial reference frame, assuming that the satellite 11 is Earth-pointed (satellite z-axis is Earth-pointed), and the satellite x-axis is in the orbital plane close to the velocity vector. From the satellite's orbit, Earth sensor data, and the Earth's calculated position, the attitude of the satellite 11 in inertial space can be exactly localized. Thus, an attitude quaternion to which the gyro 17 must be initialized can be computed. Immediately after initialization of the gyro 17, the satellite 11 executes a large slew using only the gyro 17 for inertial reference and reaction wheels to align the thrust vector of the satellite 11 with the desired EOR profile.

Once on the profile, the EOR state machine 14 is transitioned to phase C where the electric propulsion thrusters are ignited, and the EOR state machine 14 then transitions to phase, D. For the next 18-20 hours, while in phase D, the satellite 11 is steered according to the EOR profile while in reaction-wheel-based gyro mode. During this time the momentum is managed by offsetting the combined thrust vector from the center of mass of the satellite 11.

Once the desired true-anomaly is reached, the electric propulsion thrusters are turned off in phase E, and then the satellite 11 is slewed back toward the Earth using the reaction-wheel-based gyro mode, with knowledge of the Earth provided by the positioning system 12 (orbit propagator 12 or GPS 12). Once the Earth is acquired, there is likely to be a small offset reported in the Earth measurement (from the Earth sensor 16), due to gyro drift and errors in the time and onboard orbital data. However a majority of this error (>95%) should be due to gyro drift alone. Once control switches to the Earth sensor 16, and the satellite 11 locks onto the Earth, the error due to the gyro 17 is removed upon next reinitialization of the onboard gyro-propagated attitude estimate in phase A. The cycle is then repeated.

It should be evident that if a user re-initializes the orbit before the onboard orbital error exceeds some predetermined amount, the entire process remains well automated. Alternatively having an onboard GPS 12 can do the same thing.

With the above in mind, FIG. 4 illustrates an exemplary electric propulsion satellite orbit raising method 40. The exemplary method 40 dynamically computes 41 the position of the satellite 11 onboard the satellite 11. An optimal satellite steering profile is also dynamically computed 42 onboard the satellite 11, based on the satellite's position in orbit. This optimal profile provides more mass benefit than prior art solutions because it simultaneously drives the satellite perigee, apogee and inclination toward target values.

The satellite 11 is steered 42, using the gyro 17 (or star tracker) for inertial reference, according to the computed profile such that a change in velocity (delta-V) of the satellite 11 is imparted in a desired direction.

Periodically (as often as needed), the propulsion system is shut down and the Earth is reacquired 43 via direct slew in conjunction with an onboard orbit propagator, for example, to re-initialize 44 the gyro and perform other satellite maintenance, if desired, and then the propulsion system is restarted 45 once on the profile again. This removes the effect of accumulated gyro drift. The reacquisition in order to reset the gyro, maybe needed as often as every revolution or as infrequently as every few days. In the case of a star tracker, periodic Earth re-acquisition 43 is not required.

Steps 41 through 45 are autonomously repeated 46 until the desired orbit is reached. No daily planning to compute the EOR attitude profile is required, as the profile is computed onboard the satellite 11 using orbital data from the onboard positioning system 12 (orbit propagator 12 or global positing system 12).

The method 40 described herein, which may last on the order of several months, automates the entire EOR process, using the state machine 14 which issues commands parameterized by the true-anomaly of the dynamically changing orbit. Since the expressions for the optimal profiles are also parameterized by the orbital data, the use of the on-board positioning system 12 (orbit propagator 12 or global positing system 12) that accounts for the imparted change in velocity (delta-V) is made. This ensures that the on-board dynamic positioning system 12 (orbit propagator 12 or global positing system 12) is properly initialized, automates the entire process, including autonomously reacquiring the Earth to reset the gyro 17 in order to remove the accumulated drift. This also eliminates the requirement for star trackers, which amounts for increased cost and mass.

Furthermore, using a state machine 14 reduces the chances of operator error and allows the satellite 11 to fly through telemetry and command outages, and streamlines the entire process. The automation provided by the state machine 14 requires that the satellite 11 only have brief coverage to just a single ground station for periodic maintenance, thus reducing orbit raising costs compared with prior art solutions.

The illustrative drawings showing the EOR timeline (FIG. 3a and FIG. 3b) depict exemplary profiles, where the satellite thruster vector is primarily steered in the orbital plane. However it is important to mention that the present invention also applies when the satellite 11 is steered out of plane, in the case of inclination removal or adjustment.

When EOR is performed with two SPTs mounted on separate dual axes positioning mechanisms (DAPMs) as depicted in FIG. 5a, full 3-axis momentum dumping is possible using techniques well known in the art. For example, in the illustration depicted in FIG. 5a, roll and pitch momentum may be dumped by actuating the north and south DAPMs together in the same direction, while yaw momentum may be dumped by actuating the north and south DAPMs in equal opposite directions. Thus the use of chemical thrusters for momentum dumping with SPTs mounted on two DAPMs is not required.

Figure 5B:
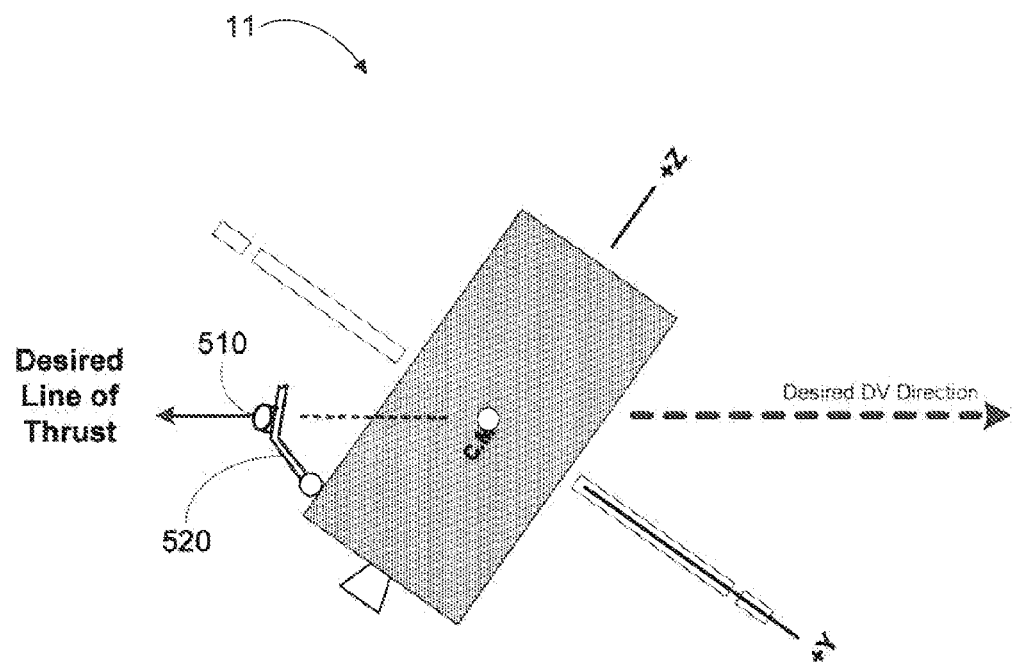
FIG. 5b illustrates an example orientation of the dual axes positioning mechanism (DAPMs) for single SPT electric orbit raising.

In an alternative embodiment, EOR may be performed with as little as a single thruster disposed on a single positioning mechanism. Referring now to FIG. 5b, thruster 510 may be aimed by positioning mechanism 520 through the center of mass of satellite 11 such that the thrust vector (or "line of thrust") is aligned with the desired line of thrust.

FIG. 3b illustrates an exemplary timeline for achieving electric propulsion satellite orbit raising with a single SPT fired through the satellite center of mass, but kept on the same EOR profile as that shown in FIG. 3a.

When EOR is performed with only one SPT, or with more than one SPT mounted on the same DAPM, momentum can only be dumped in two of the three axes at any moment of time. This is because offsetting the net thrust vector from the center of mass produces only torques orthogonal to the thruster vector (or "line of thrust"). At any moment of time, it is not possible to generate torque parallel to the thrust vector, hence the direction in which momentum cannot be dumped is the same as the thrust vector itself. From this, one can incorrectly assume that use of additional actuators may be required to manage momentum in the direction of the thrust vector. However, this is not the case, because the line of thrust (i.e. the unmanageable axis) rotates in inertial space.

Figure 6:
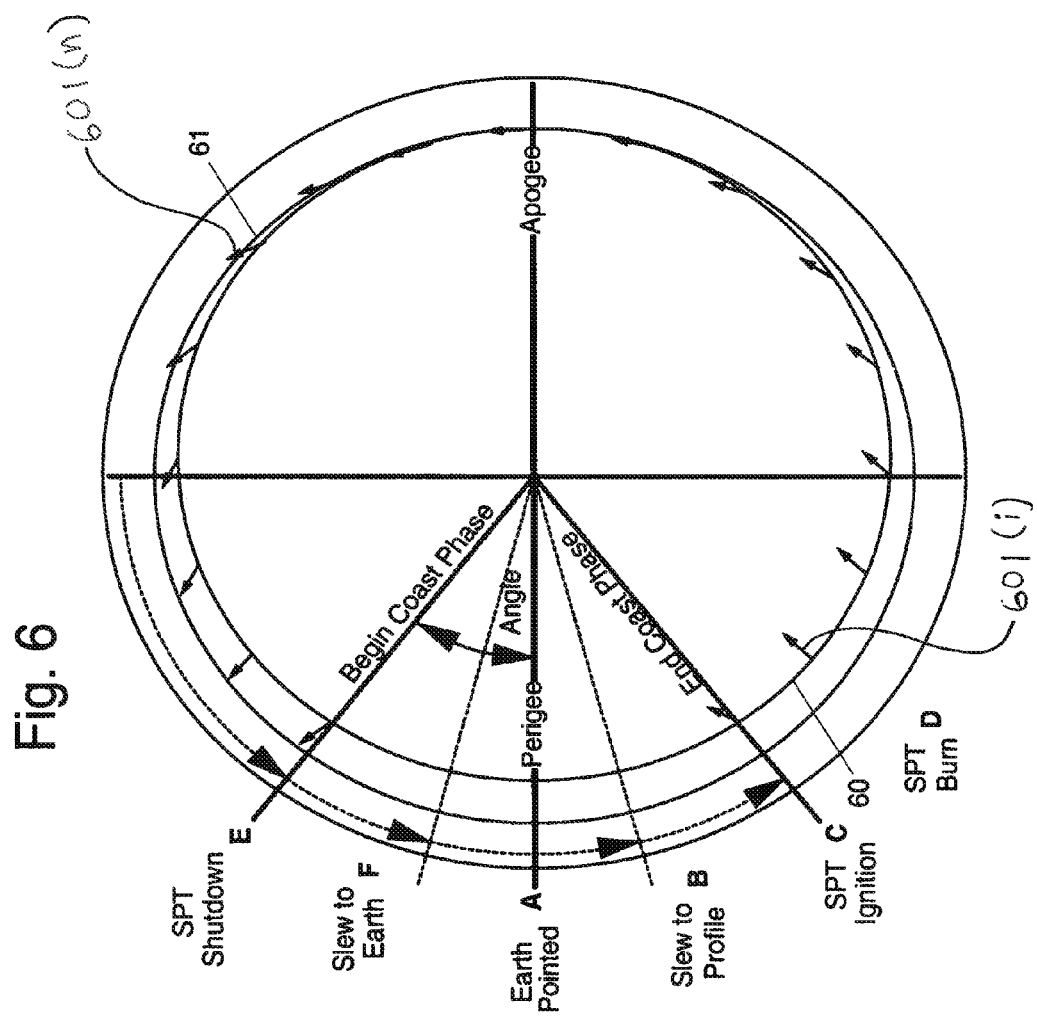
FIG. 6 illustrates an example orientation of the ideal electric orbit raising thrust vector profile in inertial space.
Figure 7:
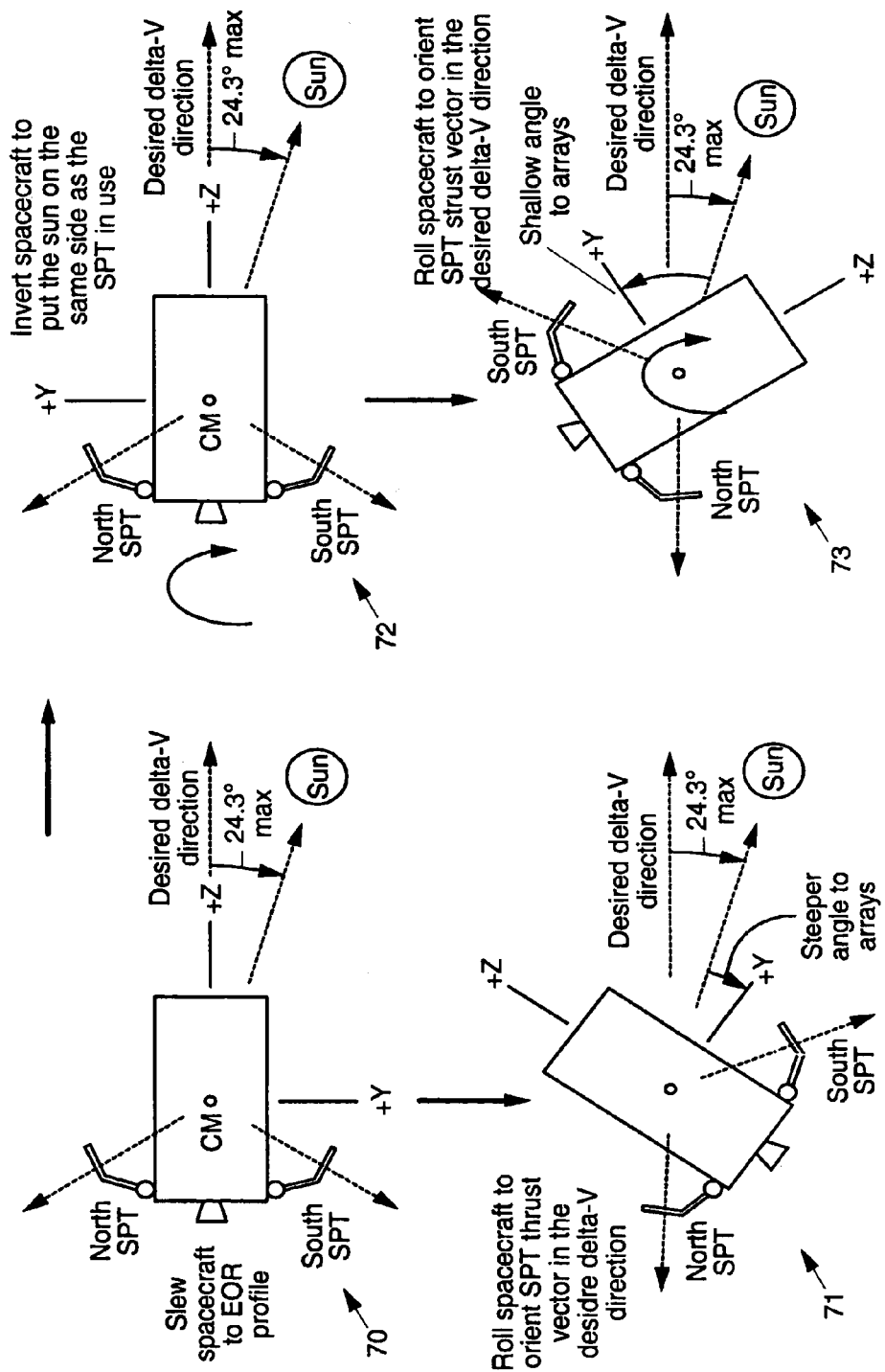
FIG. 7 illustrates an example orientation of the Sun with respect to the satellite during single SPT electric orbit raising.

For example, referring now to FIG. 6, a spacecraft trajectory is illustrated as viewed from an angle orthogonal to the orbital plane of the trajectory. The desired line of thrust at each of a series of locations along the trajectory is depicted by a vector arrow. For example, vector arrow 601(*i*) and vector arrow 601(*n*) illustrate the desired line of thrust near respective locations 60 and 61. It may be observed that, between location 60 and 61, the desired line of thrust undergoes a substantial rotation in inertial space. In the illustrated example, the rotation is approximately ninety degrees. This net rotation may be provided by steering satellite 11 to which the thruster is mounted.

The present inventors have appreciated that, using the presently disclosed techniques, the momentum wheels may accumulate momentum in an initially unmanageable axis, until the satellite 11 is steered to an orientation where that momentum can be dumped. Therefore, even though at any moment of time, only two axes of momentum can be dumped, the net rotation of the desired line of thrust in inertial space implies that, within a determinable period of time, the manageable axes may rotate by 90 degrees, thereby spanning the previously unmanageable portion of the 3D space. Thus, given adequately sized momentum wheels, and a desired line of thrust that undergoes a substantial rotation in inertial space, three axis momentum management may be provided by a thruster disposed on a single positioning mechanism.

Although a detailed explanation of an implementation using SPTs for electric orbit raising has been described above, the present momentum management techniques may be employed for many types of orbit transfer missions, and with chemical or electric thrusters of many types, provided only that the desired line of thrust makes a substantial rotation in inertial space within a period of time commensurate with the momentum storage capability of the spacecraft. The above mentioned constraint may be met for many spacecraft missions that require attitude change in inertial space. Such missions may include central body (e.g., Earth, Moon or Sun)

pointing missions as well as continuous delta V missions such as low thrust orbit raising missions. In such missions, the attitude of the spacecraft ordinarily undergoes motions in inertial space for mission objectives other than momentum management. As an advantageous result, using the presently disclosed techniques, the torque authority provided by a single gimbaled thruster may, over time, be used to span a substantial portion of the entire 3D inertial space.

As a further example, the present techniques may be useful for a small spacecraft orbiting the Earth in a low earth orbit, having control moment gyros (CMGs). The purpose of this spacecraft may be reconnaissance, whereby it periodically takes images of the Earth, by rapidly slewing its main bus using the CMGs. For this type of a satellite, the momentum is typically accumulated in a fixed direction in inertial space. If a single thruster aimed through the center of mass is present, than the entire satellite may be rapidly steered using the CMGs in 3D space, to quickly dump full 3-axis momentum.

Figure 8:
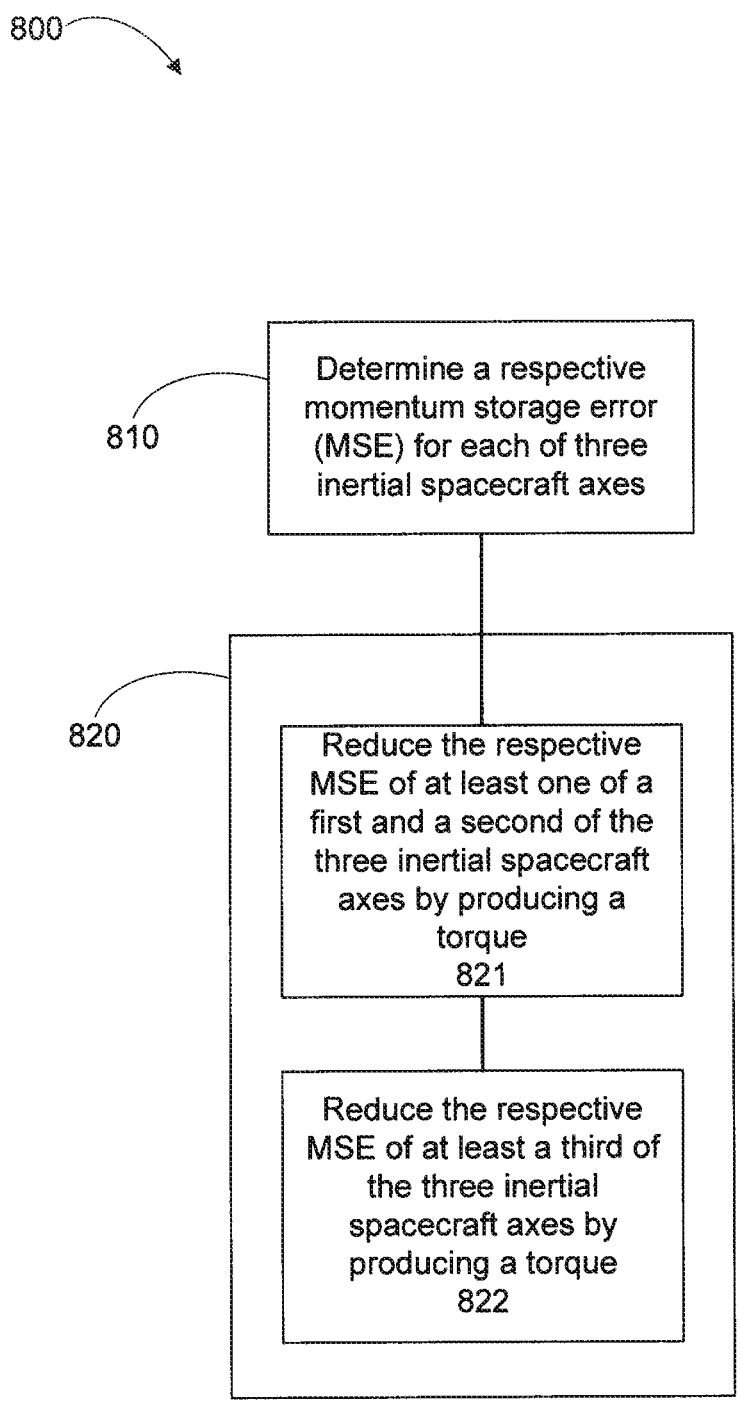
FIG. 8 illustrates an example momentum management method

Referring now to FIG. 8, method 800 for managing momentum of a spacecraft traveling along a trajectory will be described. As the spacecraft travels along the trajectory, a desired line of thrust undergoes a substantial rotation in inertial space. At block 810, a respective momentum storage error (MSE) may be determined for each of three inertial spacecraft axes. The respective MSE may represent a difference, for each respective axis, between a momentum value actually stored and a desired momentum value.

At block 820, each respective MSE may be reduced by producing a plurality of torques with at least one thruster disposed on a single positioning mechanism. More particularly, at block 821, a first torque may be produced by orienting the thruster, with the single positioning mechanism. The first torque may reduce the respective MSE of at least one of a first and a second of the three inertial spacecraft axes when the spacecraft is located at a first location on the trajectory. Subsequently, at block 822, when the spacecraft is located at a second location on the trajectory, a second torque may be produced that reduces the respective MSE of at least a third of the three inertial spacecraft axes by orienting the thruster, with the single positioning mechanism.

Advantageously, spacecraft acceleration and MSE may be simultaneously controlled by the at least one thruster disposed on the single positioning mechanism.

Figure 9:
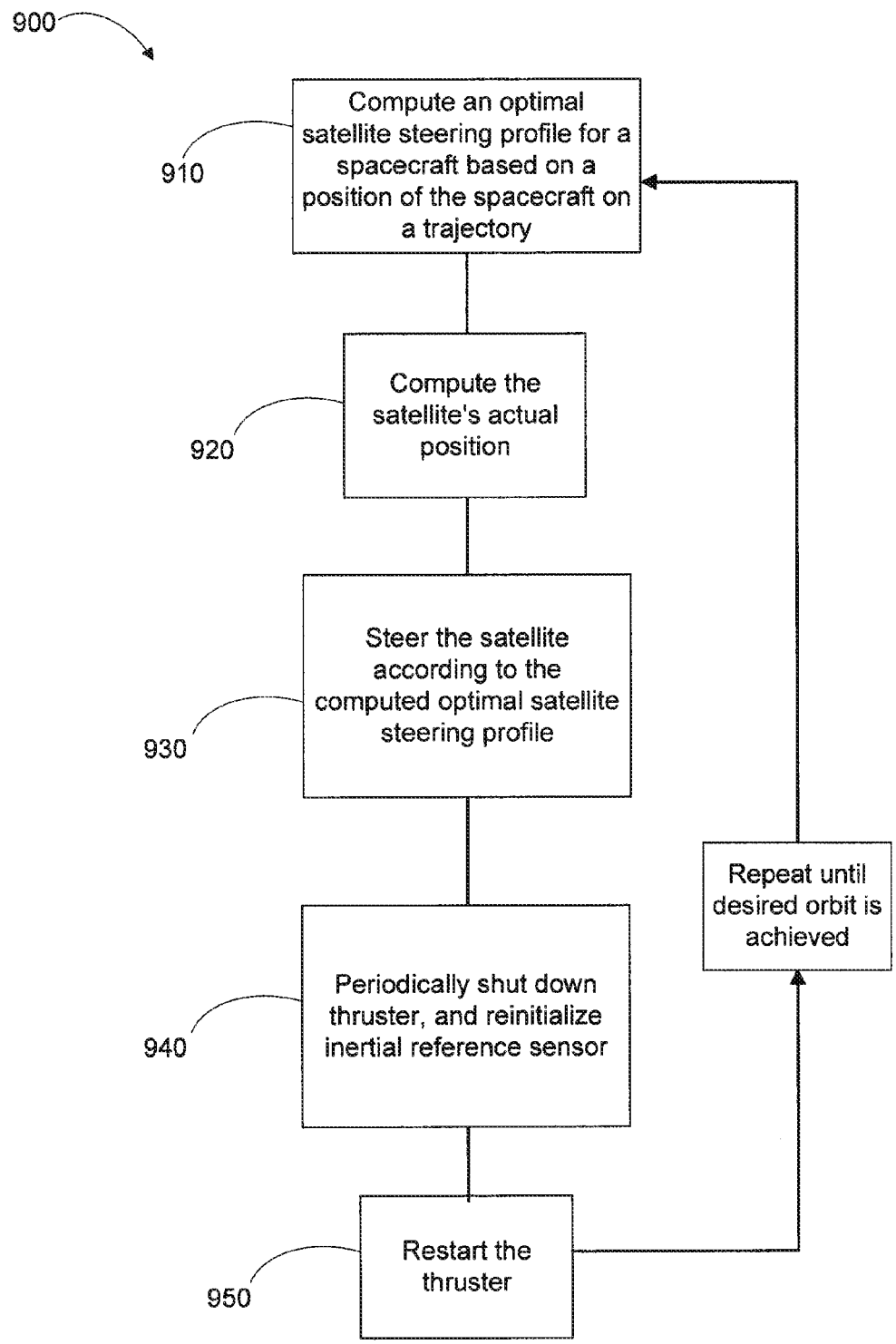
FIG. 9 illustrates an example orbit transfer method

Referring now to FIG. 9, method 900 will be described. At block 910, an optimal satellite steering profile for a spacecraft may be dynamically computed, based on a position of the spacecraft on a trajectory. The spacecraft may include at least one thruster disposed on a single positioning mechanism, an orbit propagator or GPS, and an inertial reference sensor. For example, the thruster may be a chemical thruster, or low thrust electric propulsion device such as a Hall effect thruster, or SPT. The inertial reference sensor may be an integrating rate gyro, or star tracker, for example.

At block 920, the satellite's actual position may be dynamically computed using, for example, outputs from the orbit propagator or GPS.

At block 930, the satellite may be steered according to the computed optimal satellite steering profile. For example, the thruster may be used to impart a change in velocity of the satellite along a desired direction;

At block 940, the thruster may be periodically shut down, and the inertial reference sensor may be re-initialized. For example, the inertial reference sensor may be re-initialized with respect to a reacquired celestial body, such as the Earth. As a further example, where the inertial references sensor is a gyro, it may be reset to remove any drift when the spacecraft is in an Earth pointed orientation, using a calculated position of the Earth relative to the satellite, satellite orbital information and Earth sensor data.

At block 950, the thruster may be restarted.

As desired, blocks 910 through 950 may be autonomously repeated until the desired orbit is reached. During such time, three axis momentum management of the satellite may be performed by the method illustrated in FIG. 8.

Thus, spacecraft momentum management techniques have been disclosed, whereby, for a spacecraft traveling along a trajectory, three-axis spacecraft momentum management may be performed by an actuator consisting of as few as one thruster disposed on a single positioning mechanism. It will be understood that, although a benefit of the present teachings is to enable three-axis spacecraft momentum management to be performed as few as one thruster disposed on a single positioning mechanism, for redundancy purposes, two or more positioning mechanisms may be provided without departing from the scope of the present teachings.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for managing momentum of a spacecraft traveling along a trajectory, the method comprising:
   determining a respective momentum storage error (MSE) in each of three inertial spacecraft axes, said respective MSE comprising a difference, for each axis, between a momentum value actually stored on the spacecraft and a desired momentum value;
   reducing each respective MSE by producing, with at least one thruster disposed on a single positioning mechanism, a plurality of torques, by:
      orienting the thruster, with the single positioning mechanism, so as to produce a first torque that reduces the respective MSE of either or both of a first and a second of the three inertial spacecraft axes when the spacecraft is located at a first location on the trajectory, and,
      orienting the thruster, with the single positioning mechanism, so as to produce a second torque that reduces the respective MSE of at least a third of the three inertial spacecraft axes when the spacecraft is located at a second location on the trajectory; wherein,
   the single positioning mechanism is configured to orient the thruster so as to simultaneously (i) accelerate the spacecraft along a line of thrust and (ii) produce a torque around at least one of two axes substantially orthogonal to the nominal thrust vector; and
   as the spacecraft travels along the trajectory, a desired line of thrust undergoes a substantial rotation in inertial space.

2. The method as recited in claim 1, wherein spacecraft acceleration and MSE are simultaneously controlled by the at least one thruster disposed on the single positioning mechanism.

3. The method as recited in claim 1, wherein the thruster is a low thrust electric propulsion device.

4. The method as recited in claim 3, wherein the thruster is a Hall effect thruster.

5. The method as recited in claim 1, wherein, as the spacecraft travels along the trajectory, the substantial rotation is approximately ninety degrees.

6. The method as recited in claim 1, wherein the single positioning mechanism has two degrees of freedom.

7. A spacecraft comprising:
at least one thruster;
spacecraft control electronics configured to:
- (i) generate a desired orbit transfer profile for the spacecraft; and
- (ii) determine a respective momentum storage error (MSE) in each of three inertial spacecraft axes, said respective MSE comprising a difference, for each axis, between a momentum value actually stored on the spacecraft and a desired momentum value; and a spacecraft steering apparatus, comprising the at least one thruster disposed on a single positioning mechanism, that, responsive to signals from the spacecraft control electronics:
controls the attitude of the satellite so as to follow the desired orbit transfer profile; and
reduces each respective MSE by producing, with the at least one thruster, a plurality of torques, by:
orienting the thruster, with the single positioning mechanism, so as to produce a first torque that reduces the respective MSE of either or both of a first and a second of the three inertial spacecraft axes when the spacecraft is located at a first location on the trajectory, and,
orienting the thruster, with the single positioning mechanism, so as to produce a second torque that reduces the respective MSE of at least a third of the three inertial spacecraft axes when the spacecraft is located at a second location on the trajectory; wherein,
the single positioning mechanism is configured to orient the thruster so as to simultaneously (i) accelerate the spacecraft along a line of thrust and (ii) produce a torque around at least one of two axes substantially orthogonal to the nominal thrust vector; and
as the spacecraft travels along the trajectory, a desired line of thrust undergoes a substantial rotation in inertial space.

8. The spacecraft as recited in claim 7 wherein the at least one thruster comprises an electric propulsion thrusters.

9. The spacecraft as recited in claim 8 wherein the at least one thruster comprises a Hall effect thruster.

10. The spacecraft as recited in claim 7, wherein, as the spacecraft travels along the trajectory, the substantial rotation is approximately ninety degrees.

11. The spacecraft as recited in claim 7 wherein the spacecraft control electronics comprises a profile generator configured to compute a desired orbit transfer profile such that perigee, apogee and inclination of the spacecraft are adjusted simultaneously in a mass-efficient manner.

12. The spacecraft as recited in claim 7 wherein the desired orbit transfer profile includes:
placing the spacecraft in an Earth-pointed attitude when the spacecraft is at a predefined point in the trajectory;
slewing the spacecraft from the Earth-pointed attitude to a desired orbit raising attitude; and
steering the spacecraft according to the desired orbit transfer profile while changing a spacecraft velocity.

13. The method as recited in claim 7, wherein the single positioning mechanism has two degrees of freedom.

14. A method comprising:
dynamically computing an optimal steering profile for a spacecraft, based on position of the spacecraft on a trajectory, the spacecraft comprising at least one thruster disposed on a single positioning mechanism and an inertial reference sensor;
dynamically computing the spacecraft's actual position;
steering the spacecraft according to the computed optimal steering profile such that the at least one thruster imparts a change in velocity of the spacecraft along a desired direction;
periodically shutting down the at least one thruster and reorienting the spacecraft;
restarting the at least one thruster;
autonomously repeating the above steps until the desired orbit is reached wherein three axis momentum management of the spacecraft is performed by:
determining a respective momentum storage error (MSE) in each of three inertial spacecraft axes, said respective MSE comprising a difference, for each axis, between a momentum value actually stored on the spacecraft and a desired momentum value;
reducing each respective MSE by producing, with at least one thruster disposed on a single positioning mechanism, a plurality of torques, by:
orienting the thruster, with the single positioning mechanism, so as to produce a first torque that reduces the respective MSE of either or both of a first and a second of the three inertial spacecraft axes when the spacecraft is located at a first location on the trajectory, and,
orienting the thruster, with the single positioning mechanism, so as to produce a second torque that reduces the respective MSE of at least a third of the three inertial spacecraft axes when the spacecraft is located at a second location on the trajectory; wherein,
the single positioning mechanism is configured to orient the thruster so as to simultaneously (i) accelerate the spacecraft along a line of thrust and (ii) produce a torque around at least one of two axes substantially orthogonal to the nominal thrust vector; and
as the spacecraft travels along the trajectory, a desired line of thrust undergoes a substantial rotation in inertial space.

15. The method as recited in claim 14, wherein the at least one thruster comprises a Hall effect thruster.

16. The method as recited in claim 14, where the inertial references sensor comprises a gyro that is reset to remove any drift when the spacecraft is in an Earth pointed orientation, using a calculated position of the Earth relative to the spacecraft, spacecraft orbital information and Earth sensor data.

17. The method as recited in claim 14, wherein the single positioning mechanism has two degrees of freedom.

* * * * *